(12) United States Patent
Ito

(10) Patent No.: US 6,754,029 B2
(45) Date of Patent: Jun. 22, 2004

(54) PORTABLE EQUIPMENT INCORPORATING MAGNETIC DISK DEVICE

(75) Inventor: Tsutomu Ito, Miyagi (JP)

(73) Assignee: Sony Corporation, Tokyo (JP)

( * ) Notice: Subject to any disclaimer, the term of this patent is extended or adjusted under 35 U.S.C. 154(b) by 322 days.

(21) Appl. No.: 10/080,315

(22) Filed: Feb. 21, 2002

(65) Prior Publication Data

US 2002/0126411 A1 Sep. 12, 2002

(30) Foreign Application Priority Data

Feb. 26, 2001 (JP) ..................................... P2001-050907

(51) Int. Cl.[7] ............................................. G11B 21/02
(52) U.S. Cl. .......................................... 360/75; 360/69
(58) Field of Search ...................... 360/69, 75; 73/1.37, 73/488, 496; 324/207.11, 207.13, 207.22, 210, 212, 207.16

(56) References Cited

U.S. PATENT DOCUMENTS 6,046,877 A * 4/2000 Kelsic .......................... 360/75
6,472,864 B1 * 10/2002 Emo et al. ............. 324/207.16
6,520,013 B1 * 2/2003 Wehrenberg ................. 73/489

* cited by examiner

*Primary Examiner*—Andrew L. Sniezek
(74) *Attorney, Agent, or Firm*—Sonnenschein, Nath & Rosenthal LLP

(57) ABSTRACT

In order to avoid destruction of recorded data on the magnetic disk due to a shock when portable equipment incorporating a magnetic disk falls from a person's hand or similar, or to minimize damage to the magnetic head and magnetic disk device, in the portable equipment incorporating a magnetic disk device, the magnetic disk device 1 is provided with a magnetic head retraction mechanism and with a held-in-hand detection mechanism which detects whether the equipment is held in a person's hand. When the held-in-hand detection mechanism detects that the equipment is not held in a person's hand, the retraction mechanism causes the magnetic head 5 to be retracted from the recorded data portion of the magnetic disk 3 to the outside, so as to protect the magnetic disk device 1 and the data recorded on the magnetic disk from shocks.

5 Claims, 8 Drawing Sheets

PORTABLE EQUIPMENT INCORPORATING MAGNETIC DISK DEVICE

RELATED APPLICATION DATA

The present application claims priority to Japanese Application(s) No(s). P2001-050907 Feb. 26, 2001, which application(s) is/are incorporated herein by reference to the extent permitted by law.

BACKGROUND OF THE INVENTION

1. Field of the Invention

This invention relates to portable equipment incorporating a magnetic disk device, such as a portable telephone set, digital camcorder, digital still camera, and portable audio equipment.

2. Description of the Related Art

In recent years, there has been remarkable progress in so-called battery-driven portable information equipment, such as portable telephones, digital camcorders, digital still cameras, and portable audio equipment. Semiconductor memory is used extensively in such recording devices incorporated in portable equipment, and storage capacities are being increased At present, 128 MB (megabyte) semiconductor memory devices are commercially marketed, and it has become possible to easily carry on one's person the image and audio data and other data downloaded from various Internet web sites However, still greater storage capacities are necessary to record high-resolution images or video files.

In order to realize such large capacities, recently portable equipment capable of incorporating small-size magnetic disk devices, measuring from 1 to 2.5 inches, has been released commercially. Such small-size magnetic disk devices have capacities of approximately 1 GB (gigabyte), or approximately ten times that of a semiconductor memory device, so that 100 or so high-resolution images of size up to 10 MB, or video files equivalent to 30 minutes of DVD (Digital Video Disc) data, can be recorded.

However, there is the problem that, in general, so-called hard disk-type magnetic disk devices are vulnerable to shocks. In order to achieve high recording densities, a magnetic head levitates or "flies" above the surface of the rotating magnetic disk with an extremely small interval of 20 nm to 50 nm between the head and the magnetic disk surface, and there is a tendency for this flying height to be further reduced.

When a shock from outside is applied to a device in which a magnetic head is flying at such a low flying height, the magnetic head and magnetic disk collide, a large scratch is formed on the magnetic disk surface, and recorded data is destroyed. If the shock is great, the magnetic head itself may be damaged as well.

Consequently magnetic disk devices often adopt glass magnetic disks or similar with high hardness, and, when the device is mounted in portable information equipment, other measures are taken as well, such as providing cushioning material in the vicinity of the magnetic disk device.

For example, when damage due to a shock occurs in a portion of a magnetic disk, so that data in this portion is destroyed, if the data is information used to manage the data written to the magnetic disk, it is even possible that all the data on the magnetic disk may be lost.

SUMMARY OF THE INVENTION

The present invention relates to portable equipment incorporating a magnetic disk device, in which the magnetic disk device is provided with a magnetic head retraction mechanism and a held-in-hand detection mechanism which detects when the equipment is held in one's hand, and configured such that, when this held-in-hand detection mechanism detects that the equipment is not held in one's hand, the retraction mechanism retracts the magnetic head from the recorded data portion of the magnetic disk to the outside, to protect the magnetic disk device, and data recorded on the magnetic disk, from shocks.

In the present invention, the above-described held-in-hand detection mechanism is configured as a mechanism which detects changes in electrostatic capacitance.

In the present invention, the above-described held-in-hand detection mechanism is configured as a mechanism which detects optical changes.

In the present invention, the above-described held-in-hand detection mechanism is configured as a mechanism which detects changes in infrared rays.

In the present invention, the above-described held-in-hand detection mechanism is configured to perform detection by a mechanical mechanism.

That is, in order to resolve the problems described above, in the present invention, damage to data caused by shocks is held to a minimum by causing a held-in-hand detection mechanism, which detects whether the portable equipment is being held by a human, and the magnetic head retraction mechanism, to operate synchronously.

There are current magnetic disk devices in which a mechanism for head retraction when not in operation is provided FIG. 10 is a summary plane view of one such example. In FIG. 10, 1 is a magnetic disk device, 2 is a spindle motor, 3 is a magnetic disk, 4 is a rotary actuator, 5 is a magnetic head, and 7 is a ramp which serves as the retraction position. 6 is a load plate which is a support mechanism provided to avoid contact between the magnetic head 5 and ramp 7 in the event of retraction of the magnetic head to the ramp.

As shown in FIG. 10, during operation the magnetic head 5 fixed at the tip of the rotary actuator 4 moves in, for example, the radial direction and records data to and reproduces data from the rotating magnetic disk 3, while maintaining a very small interval between the magnetic head 5 and the surface of the magnetic disk 3.

When not in operation, as shown in FIG. 11 by the summary plane view of the example, the tip of the rotary actuator 4 is configured so as to move onto the ramp provided adjacent to the magnetic disk 3, in this case the load plate 6 is placed on top of the ramp 7 such that contact between the magnetic head 5 and the surface of the ramp 7 is avoided, in FIG. 11, portions corresponding to those in FIG. 10 are assigned the same symbols, and redundant explanations are omitted.

As shown by the schematic diagram of the manner of motion of the load plate 6 in FIG. 12, the ramp 7 is provided with a taper portion 7a which continues smoothly from the surface of the magnetic disk 3, and a placement portion 7b; as a result of movement of the rotary actuator 4 from above the magnetic disk 3, the load plate 6 rises along the taper portion 7a of the ramp 7 and is placed on the placement portion 7b, as indicated by the arrow a. By making the placement portion 7b lower than the upper end of the taper portion 7a, as shown in the figure, stable placement on the placement portion 7b is possible.

The main object of this retraction mechanism is to prevent the magnetic head 5 from adhering to the magnetic disk 3, as a result of contact between the magnetic head 5 and the surface of the magnetic disk 3 upon cessation of rotation of the magnetic disk 3 when not in operation.

However, this retraction mechanism also contributes to improvement of shock resistance. This is because when a large shock is applied from outside while the magnetic head is retracted, even if the magnetic head vibrates; it is not superposed on the magnetic disk, and so contact with the magnetic disk can be avoided.

Among the magnetic disk devices that are currently marketed commercially there are devices which have a shock resistance during operation of from 100 to 200 G (peak value of a one-half sine wave shock of length 2 ms) (where G is gravitational acceleration); but there are devices which can withstand shocks of 1500 G when not in operation. This difference in shock resistance is due to the above-described magnetic head retraction mechanism.

Hence in portable information equipment incorporating such a magnetic disk device, if a shock from outside can be anticipated, and the magnetic head is retracted by the retraction mechanism before the shock is received, the possibility of damage can be reduced.

Most large shocks born by portable equipment are due to slipping off the hand while being held by a person as a result of carelessness, or to otherwise being separated from one's hand and falling. If the portable equipment is being held by a person by some means, evasive action to avoid a shock, or protective action such as covering the equipment with one's hand, can be taken in that instant.

By means of this invention, a held-in-hand detection mechanism can be used to quickly detect a state in which there is a high probability of a collision, that is, a state of separation from the hand of a person, the magnetic head of the magnetic disk device can be retracted prior to the collision, and the equipment can be put into a shock-resistant state, so that considerable damage can be prevented.

Normally, the time for an object to fall from the height of a desk, for example 70 cm, and collide with the floor is 0.38 seconds. On the other hand, the time required for retraction of the magnetic head in the above-described magnetic disk device is, at most, several tens of milliseconds. Hence in the case of a fall from a certain height, retraction within the time until the collision is entirely possible, that is, avoidance of the shock is possible.

DESCRIPTION OF THE PREFERRED EMBODIMENTS

Figure 1:
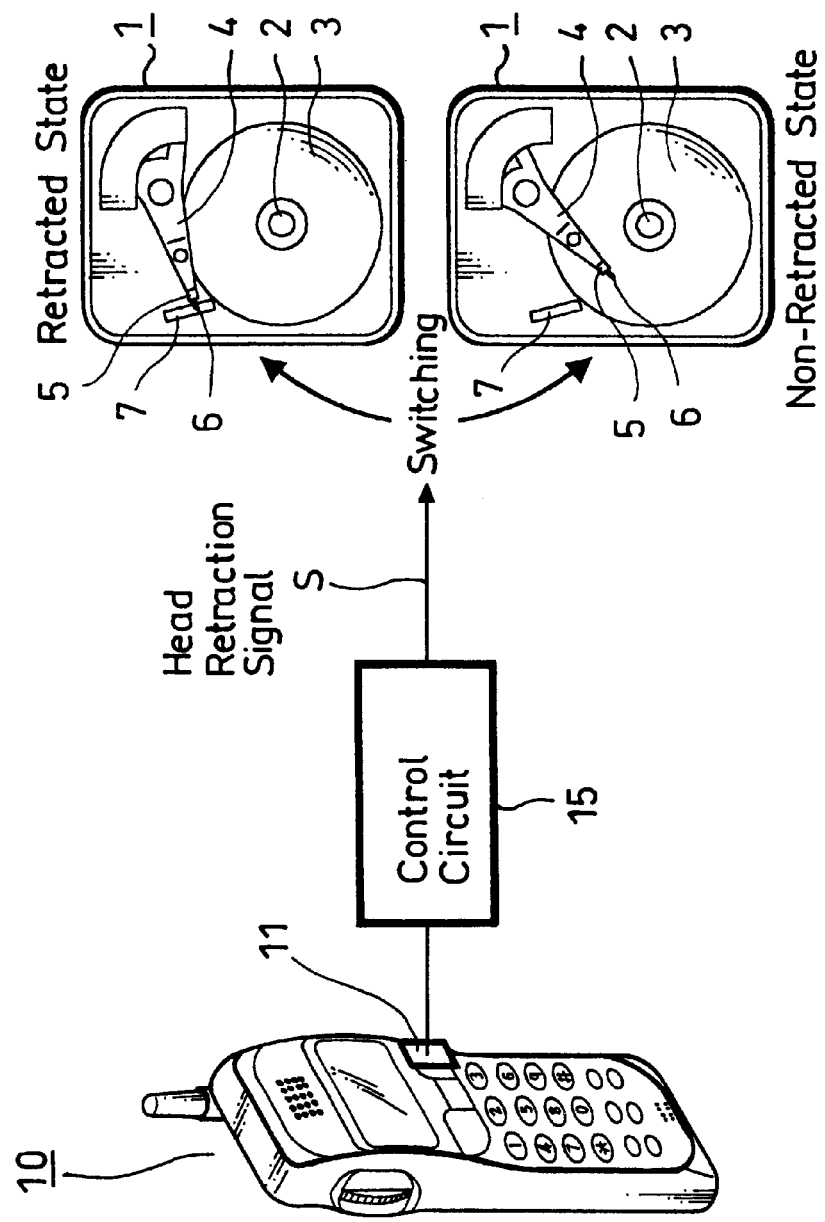
FIG. 1 is a figure which explains one example of portable equipment incorporating a magnetic disk device.

Below, various modes of the held-in-hand detection mechanism are explained in detail as embodiments of the portable equipment incorporating a magnetic disk device of this invention, referring to the drawings; however, this invention is not limited to these embodiments.

Figure 10:
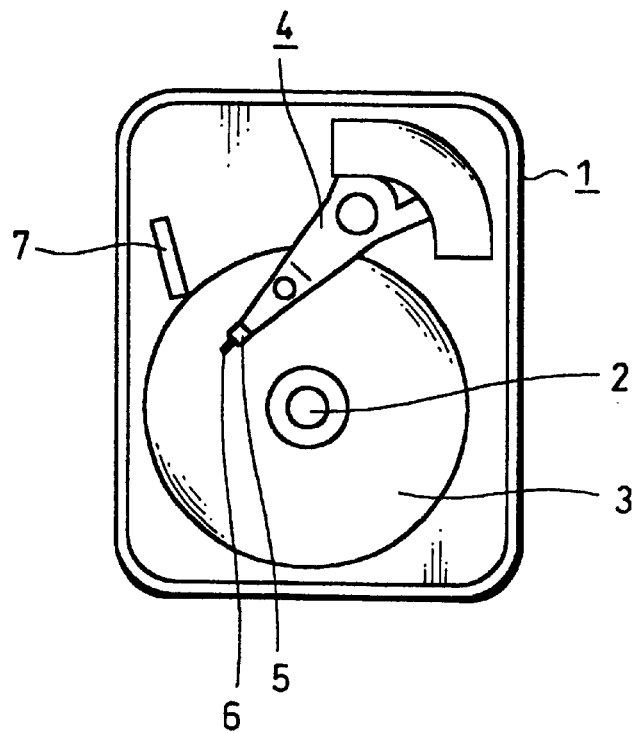
FIG. 10 is a plane view of a magnetic disk device.
Figure 11:
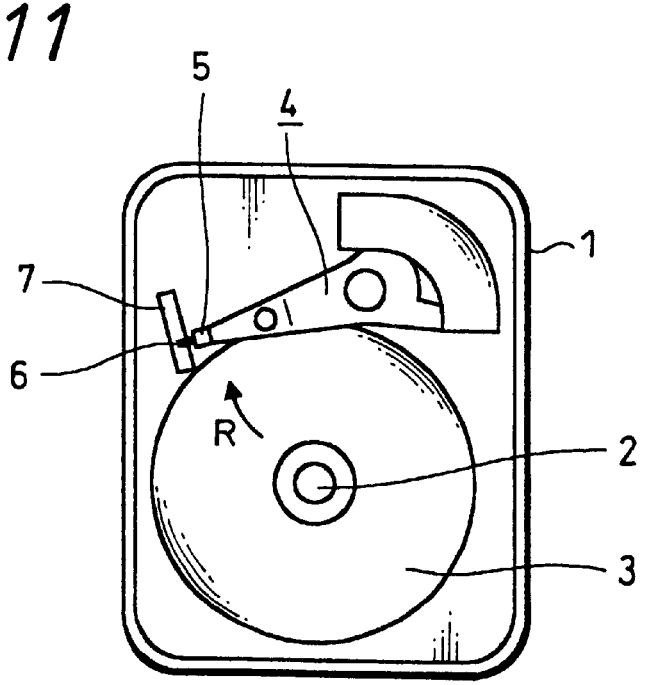
FIG. 11 is a plane view of a magnetic disk device.
Figure 12:
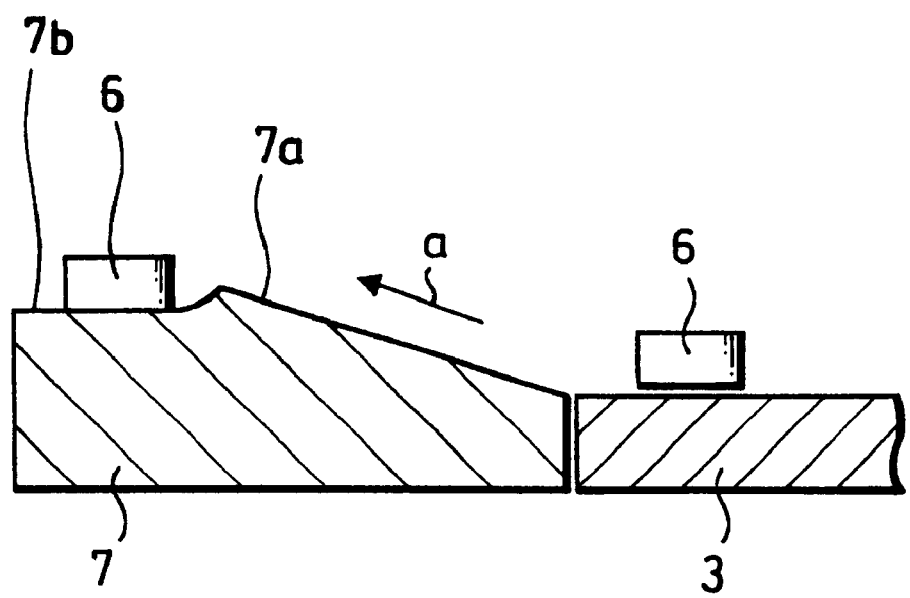
FIG. 12 is a figure which explains a retraction mechanism.

In each example, the magnetic head retraction mechanism explained in the above FIG. 10 through FIG. 12 is provided in the magnetic disk device, and a held-in-hand detection mechanism which detects whether the equipment is held in a person's hand is provided, configured such that, when not held in the hand, the retraction mechanism causes the magnetic head to be retracted to the retraction portion, to protect the magnetic disk device and the data recorded on the magnetic disk from shocks.

[First Embodiment]

In this example, a mechanism which detects changes in electrostatic capacitance is used as the held-in-hand detection mechanism. In this example, a portable telephone or other portable equipment incorporating a magnetic disk device is configured with an electrostatic sensor 11 inserted into a portion of the housing, as shown in the schematic explanatory diagram of one example in FIG. 1. By inserting the electrostatic sensor 11 in a position with which contact is made when the portable equipment 10 is held in the hand, it is possible to detect whether the equipment is being held by a person, and if a state of not being held is detected, the control circuit 15 may for example output a head retraction signal S, putting the magnetic head 5 of the magnetic disk device 1 into the retracted state.

Thereafter, when a state of being held is detected, switching can be performed to return to the non-retracted state. Parts in FIG. 1 corresponding to those in FIG. 10 are assigned the same symbols 2 is a spindle motor, 4 is a rotary actuator, 6 is a load plate, and 7 is a ramp.

As in the example explained in FIG. 1, in the operating state, that is, the non-retracted state, the magnetic head 5 fixed at the tip of the rotary actuator 4 moves in the radial direction of the magnetic disk 3, for example, and performs data recording and reproduction while maintaining a very small interval of 20 nm to 50 nm above the surface of the rotating magnetic disk 3.

When put into the retracted state upon output of a head retraction signal S by the above-described electrostatic sensor 11, the tip of the rotary actuator 4 moves, and the load plate 6 is for example placed on the ramp 7, so that the magnetic head 3 is retracted to outside the recorded data portion on the magnetic disk 3.

Figure 2:
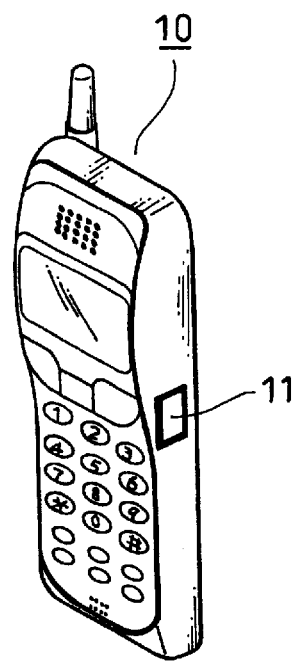
FIG. 2 is a figure which explains one example of portable equipment incorporating a magnetic disk device.

The electrostatic sensor 11 which detects such changes in electrostatic capacitance may be provided on a side surface of the portable equipment incorporating a magnetic disk device, as shown in FIG. 2.

Many recent portable equipment units adopt a housing of magnesium alloy or some other metal, in order to act as an electric shield, or in order to realize strong and lightweight equipment. In this example, a case in which the housing of the portable equipment incorporating a magnetic disk device is made of a conductive material is explained.

Figure 3:
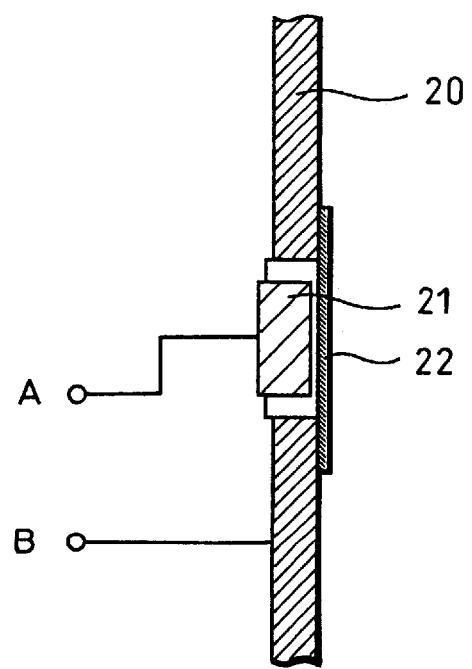
FIG. 3 is an enlarged cross-sectional view of a portion of one example of portable equipment incorporating a magnetic disk device.

FIG. 3 is an enlarged cross-sectional view of a portion of portable equipment incorporating a magnetic disk device, in which is provided an electrostatic sensor 20 is a conductive housing, and is configured so that, for example, a portion of the housing 20 is cut out, and the sensor electrode 21 is inserted. 22 is a non-conductive thin film covering the surface, such that the electrostatic sensor electrode and the outside are electrically insulated. A is a terminal from the electrostatic sensor electrode 21, and B is a terminal from the housing 20.

Figure 4:
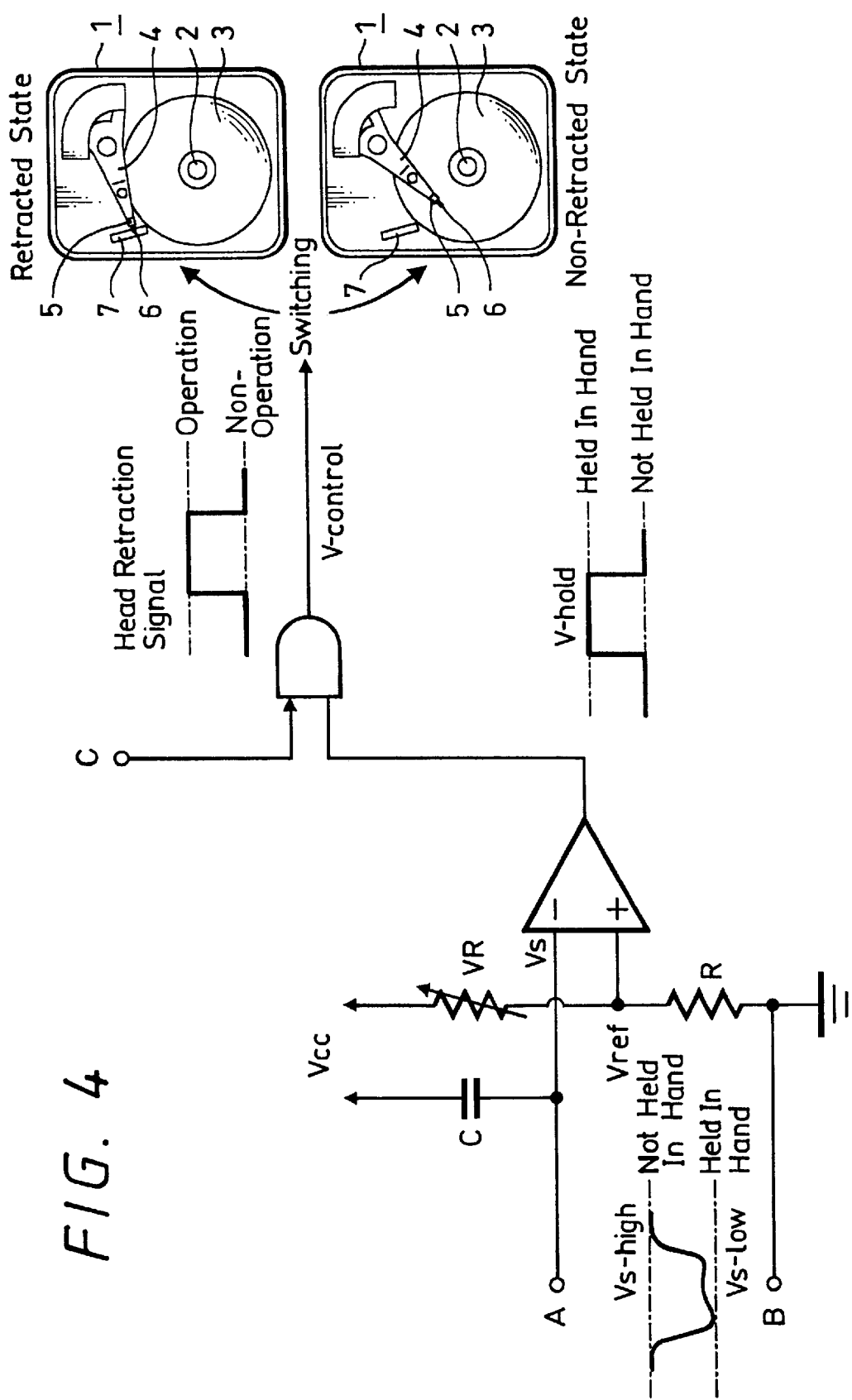
FIG. 4 is a figure explaining a held-in-hand detection mechanism employing electrostatic capacitance and a mode of retraction.

FIG. 4 shows a mechanism for detecting whether the equipment is held in the hand, using the output from the terminals A and B in FIG. 3. The terminal A of the electrostatic sensor electrode 21 is connected to the power supply Vcc via a capacitor C. The sensor voltage Vs changes according to the electrostatic capacitance between the electrostatic sensor electrode 21 and the housing 20. The sensor voltage Vs is connected to the (−) input of a comparator.

The terminal B of the housing 20 is grounded, and a reference voltage Vref, set using a variable resistance VR and resistance R, is connected to the (+) input of the comparator. By comparing the sensor voltage Vs and reference voltage Vref using such a configuration, a held-in-hand or not-held-in-hand signal V-hold can be obtained This is explained below.

When the equipment is not held in a person's hand, by appropriately setting the distance between the sensor electrode and the housing, the electrostatic capacitance between the sensor electrode 21 and housing 20 can be made comparatively small, and the sensor voltage Vs is set to a comparatively high voltage Vs-high.

On the other hand, when the equipment is held in a person's hand, the housing and hand are at the same potential. By bringing the hand into proximity to the sensor electrode 21, the electrostatic capacitance between the hand and sensor electrode 21 increases. Hence the sensor voltage Vs decreases, resulting in the comparatively low voltage Vs-low.

That is, if the reference voltage Vref is set midway between Vs-high and Vs-low, a held-in-hand signal V-hold, indicating whether the equipment is or is not being held in a person's hand, can be obtained.

Also, by outputting a head retraction signal V-control only when a signal to permit retraction operation of the magnetic disk device is input, as indicated by the input from the terminal C for example, retraction operations can be prevented when retraction operation is not necessary, for example when the equipment is being operated while one's hand is removed from the equipment, or when the equipment is being held in the hand via a non-conducting member (such as gloves). In this way, more precise control is possible.

By means of this retraction signal V-control, the magnetic disk device can be changed from the non-retracted state to the retracted state, that is, the magnetic head 5 can be moved onto the ramp 7, as shown in the figure. When there is a change from a non-held-in-hand state to a held-in-hand state, the magnetic disk device can again be changed from the retracted state to the non-retracted state. In FIG. 4, parts which correspond to those in FIG. 1 are assigned the same symbols, and redundant explanations are omitted.

By providing a such held-in-hand detection mechanism based on chances in electrostatic capacitance, the magnetic head can be retracted before the equipment is separated from one's hand and receives a shock, hence destruction of the recorded contents of the magnetic disk and damage to the magnetic head caused by the unintentionally dropping or similar of portable equipment incorporating a magnetic disk device can be effectively avoided.

[Second Embodiment]

Figure 5:
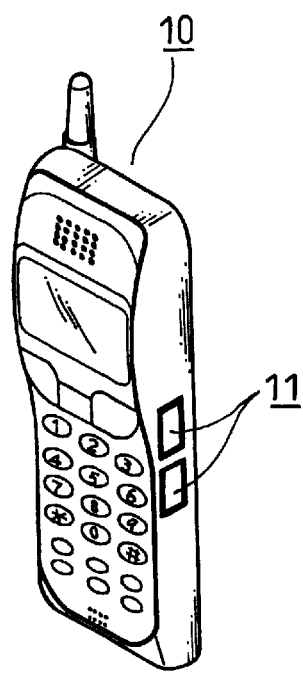
FIG. 5 is a figure which explains one example of portable equipment incorporating a magnetic disk device.
Figure 6:
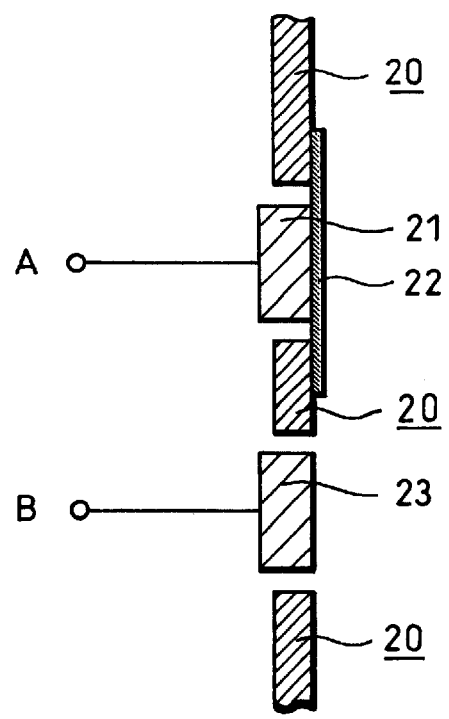
FIG. 6 is an enlarged cross-sectional view of a portion of one example of portable equipment incorporating a magnetic disk device.

Next, another example of portable equipment incorporating a magnetic disk device of this invention, employing a held-in-hand detection mechanism using changes in electrostatic capacitance, is explained referring to FIG. 5 and FIG. 6. In this example, a case in which the housing of the portable equipment incorporating a magnetic disk device is made of plastic or other non-conductive material is explained.

In the configuration of this example, an electrostatic sensor 11 is provided comprising, for example, a pair of electrodes on, for example, a side surface of the portable equipment 10, as shown in FIG. 5.

FIG. 6 shows schematically one example of the configuration of the electrostatic sensor in this case 20 is a non-conductive housing; 21 is an electrostatic sensor electrode; 22 is a non-conductive thin film covering the electrostatic sensor electrode; and 23 is an opposing electrode. In this case, the opposing electrode 23 is exposed to the outside, and comes into contact with the hand when, for example, the portable equipment incorporating a magnetic disk device is held in the hand.

In other words, in this case the opposing electrode 23 is grounded by contact with the hand. Hence by connecting the terminal A from the electrostatic sensor electrode 21 and the terminal B from the opposing electrode 23 to the circuit configuration explained in FIG. 4, it is possible to detect whether the equipment is being held in one's hand, similarly to the above-described first embodiment.

By adopting such a configuration, even in cases where the housing is non-conductive, the magnetic head can be retracted prior to a shock due to dropping from one's hand or some other cause, similarly to the first embodiment, and so destruction of recorded data on the magnetic disk, and damage to the magnetic head, can be reliably avoided.

[Third Embodiment]

Figure 7:
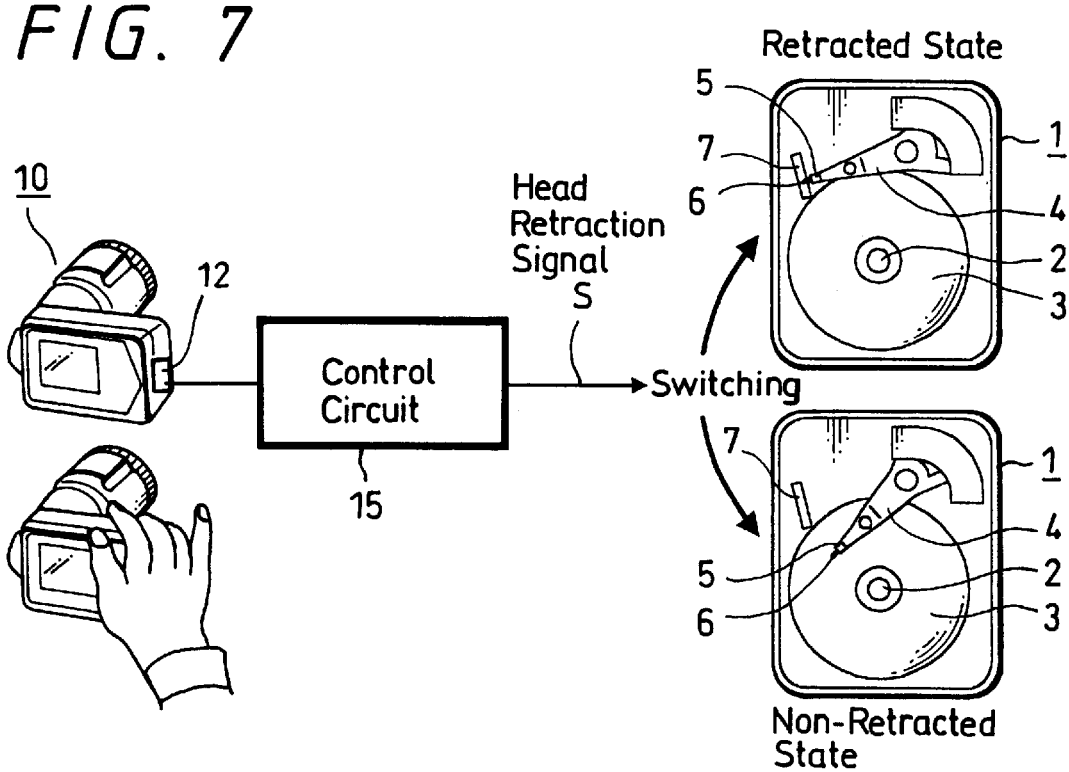
FIG. 7 is a figure which explains one example of portable equipment incorporating a magnetic disk device.

An example of portable equipment incorporating a magnetic disk device of this invention, using a held-in-hand detection mechanism employing optical changes, is explained referring to the explanatory diagram of FIG. 7. In this case, similarly to the case of the above-described second embodiment, it is preferable that the housing of the portable equipment incorporating a magnetic disk device be non-conductive.

In FIGS. 7, 10 indicates, for example, a digital camcorder, digital still camera, or other portable equipment incorporating a magnetic disk device, 12 is an optical sensor.

When the digital camcorder, digital still camera or other equipment is held in the hand, often the positional relationship of the hand with the portable equipment incorporating a magnetic disk device is fixed. In such cases, by providing an optical sensor 12 in a portion covered by the hand, whether the equipment is held in the hand can be detected by chances in the amount of light.

For example, when the equipment is held in the hand, because it is covered by the hand, the amount of light detected by the optical sensor 12 is small, and when not held in the hand, the optical sensor is not covered, so that the amount of light detected increases due to sunlight and external light. This change in the amount of light can be employed to quickly detect whether the equipment has left a person's hand, so that the control circuit 15 sends a head retraction signal S to the magnetic disk device 1, to put the magnetic disk device into the retracted state, such that the magnetic head 5 is moved from above the magnetic disk 3 onto the ramp 7. In FIG. 7, parts which correspond to those in FIG. 1 are assigned the same symbols, and redundant explanations are omitted.

In cases of use at nighttime, or when a sufficient amount of sunlight or external light cannot be detected, a photo-emitting element may for example be provided in proximity to the optical sensor, in a configuration such that light from this element is not detected when the equipment is held in the hand, by this means, the optical sensor can similarly detect changes in the amount of lights.

In this case also, similarly to each of the above examples, by detecting the separation of the equipment from the hand of a person and causing the magnetic head to be retracted, damage to data recorded on the magnetic disk and to the magnetic head caused by a shock due to falling or some other cause can be reliably avoided.

[Fourth Embodiment]

Figure 8:
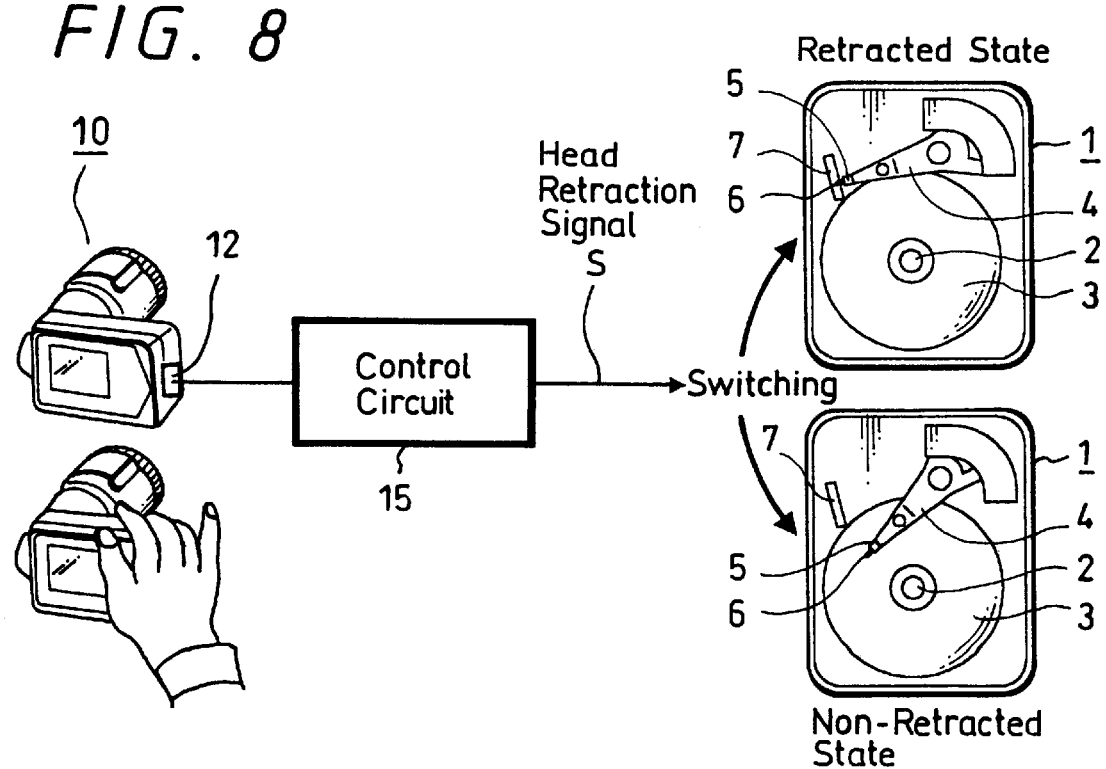
FIG. 8 is a figure which explains one example of portable equipment incorporating a magnetic disk device.

Next, an example of portable equipment incorporating a magnetic disk device of this invention, using a held in hand detection mechanism based on changes in infrared rays, is explained referring to FIG. 8. This example is configured such that infrared rays from the hand are detected by an infrared ray sensor 16. This case also, similarly to the above-described third embodiment, is preferred for use when the positional relationship with the hand is fixed, as in the case of for example digital camcorders, digital still cameras, and other portable equipment incorporating a magnetic disk device.

In this configuration, the infrared ray sensor 16 detects when infrared rays from the hand have fallen to zero or to less than a threshold value, a control circuit 15 outputs a head retraction signal S, the magnetic disk device is put into the retracted state, and the magnetic head 5 is retracted to the ramp 7. In FIG. 8, parts which are the same as in FIG. 1 are assigned the same symbols, and redundant explanations are omitted.

In this case also, similarly to the examples explained above, by detecting the separation of the equipment from the hand of a person and retracting the magnetic head, damage to recorded data on the magnetic disk and to the magnetic head as a result of a shock due to falling or some other cause can be reliably avoided.

[Fifth Embodiment]

Figure 9:
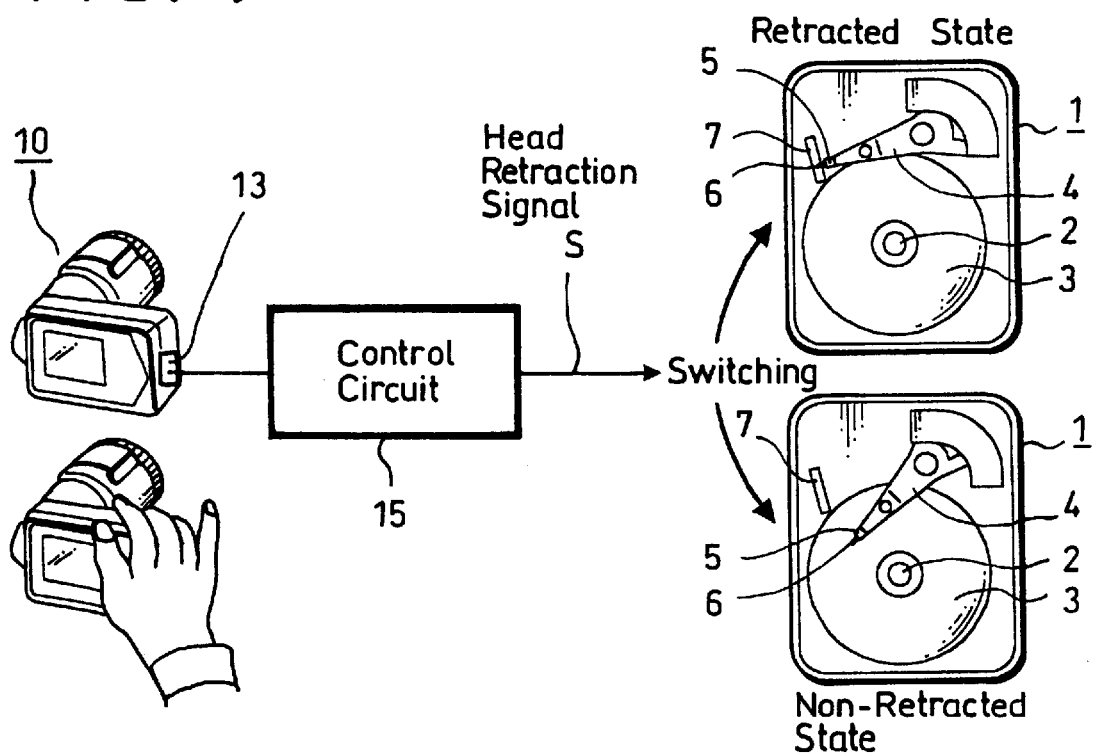
FIG. 9 is a figure which explains one example of portable equipment incorporating a magnetic disk device.

In this example, an example of portable equipment incorporating a magnetic disk device of this invention, using a held-in-hand detection mechanism based on a mechanical mechanism, is explained referring to FIG. 9. This case also is preferred for use when the positional relationship of the hand with the portable equipment incorporating a magnetic disk device 10 is fixed.

As the mechanical mechanism for example, a mechanical switch 13 shown in FIG. 9 can be used. When a digital camcorder or other portable equipment incorporating a magnetic disk device 10 is held in the hand, this mechanical switch 13 may, for example, be configured so as to be automatically depressed, and so turned on; when the equipment is removed from the hand, the change of the mechanical switch from the on to the off state is detected, a head retraction signal S is output by the control circuit 15, the magnetic disk device is put into the retracted state, and the magnetic head 5 is retracted to the ramp 7. In FIG. 9, parts which are the same as in FIG. 1 are assigned the same symbols, and redundant explanations are omitted.

In this case also, similarly to the examples explained above, by detecting the separation of the equipment from the hand of a person and retracting the magnetic head, damage to recorded data on the magnetic disk and to the magnetic head as a result of a shock due to falling or some other cause can be reliably avoided.

Of course, as other examples using a mechanical mechanism, various modes can be adopted, such as a configuration in which for example a shutter and an optical sensor are used together, so that light is detected when the equipment is held in the hand, and a reduction in the amount of light when the equipment is separated from the hand and the shutter is closed is detected; or a configuration in which normally a held-in-hand detection mechanism based on an optical sensor is used, but a mechanical mechanism is used in dark places where sufficient external light is not available, or at nighttime.

In each case, an example was explained in which, as a magnetic head retraction mechanism, a mechanism which causes the magnetic head to be retracted to a ramp provided on the outside of the magnetic disk is used, In addition, in cases where, for example, a retraction region having a roughened surface is provided on the magnetic disk other than the recorded data portion, for example, in the inner or outer portions of the disk, a mechanism may be employed which causes the magnetic head to be retracted to such regions, and in other ways also the present invention can be applied to portable equipment incorporating a magnetic disk device having various retraction mechanisms.

As explained above, by means of the portable equipment incorporating a magnetic disk device of this invention, separation of the equipment from one's hand can be quickly detected, and the magnetic head can be retracted from the recorded data portion to the outside, so that destruction of recorded data on the magnetic disk resulting from shocks due to falling or other causes can be avoided, damage to the magnetic disk head and/or to the magnetic disk device itself can be held to a minimum, and the lifetime of the portable equipment incorporating a magnetic disk device can be extended.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. Portable equipment incorporating a magnetic disk device, wherein said magnetic disk device is provided with a magnetic head retraction mechanism, and a held-in-hand detection mechanism which detects whether said equipment is held in a person's hand; and, when said held-in-hand detection mechanism detects that the equipment is not held in said hand, said retraction mechanism causes said magnetic head to be retracted from the recorded data portion of said magnetic disk to the outside, such that said magnetic disk device, and the data recorded on said magnetic disk, are protected from shocks.

2. The portable equipment incorporating a magnetic disk device according to claim 1, wherein said held-in-hand detection mechanism performs detection based on changes in electrostatic capacitance.

3. The portable equipment incorporating a magnetic disk device according to claim 1, wherein said held-in-hand detection mechanism performs detection based on optical changes.

4. The portable equipment incorporating a magnetic disk device according to claim 1, wherein said held-in-hand detection mechanism performs detection based on changes in infrared rays.

5. The portable equipment incorporating a magnetic disk device according to claim 1, wherein said held-in-hand detection mechanism performs detection based on a mechanical mechanism.

* * * * *